US008718379B2

(12) United States Patent
Thomas et al.

(10) Patent No.: US 8,718,379 B2
(45) Date of Patent: May 6, 2014

(54) METHOD AND APPARATUS FOR IMAGE CAPTURING TAMPERING DETECTION

(75) Inventors: Deborah K. Thomas, La Grande, OR (US); Darnell J. Moore, Allen, TX (US); Vinay Sharma, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 278 days.

(21) Appl. No.: 12/882,926

(22) Filed: Sep. 15, 2010

(65) Prior Publication Data

US 2011/0064315 A1    Mar. 17, 2011

Related U.S. Application Data

(60) Provisional application No. 61/242,636, filed on Sep. 15, 2009.

(51) Int. Cl.
*G06K 9/48*    (2006.01)
*G06K 9/68*    (2006.01)

(52) U.S. Cl.
USPC .......................................... 382/199; 382/218

(58) Field of Classification Search
USPC .......................................... 382/100, 199, 283
See application file for complete search history.

(56) References Cited

U.S. PATENT DOCUMENTS

| 6,831,990 | B2 * | 12/2004 | Marvel et al. | 382/100 |
| 7,505,606 | B2 * | 3/2009 | Lin et al. | 382/100 |
| 8,073,261 | B2 * | 12/2011 | Skans | 382/209 |

OTHER PUBLICATIONS

J. Canny "A computational approach to edge detection." IEEE Trans. Pattern Anal. Mach. Intell., 8(6): 679-698, 1986.

* cited by examiner

*Primary Examiner* — Daniel Mariam
(74) *Attorney, Agent, or Firm* — Mirna Abyad; W. James Brady; Frederick J. Telecky, Jr.

(57) ABSTRACT

A method and apparatus for detecting tampering with an image capturing device. The method includes determining a change has occurred in average intensity if an image, determining a percentage area of a foreground mask, detecting related at least one edge and determining at least one edge weight, utilizing the average intensity, the percentage area of the foreground mask, and the at least one edge weight to determining offset of edge blocks of an image, and utilizing the determining offset of edge blocks to detect tampering with an image capturing device.

6 Claims, 3 Drawing Sheets

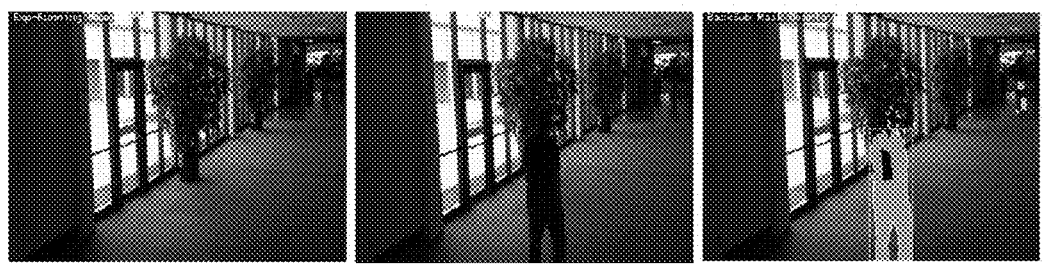
FIG. 3
FIG. 4
| -1 | 0 | +1 |
|----|---|----|
| -2 | 0 | +2 |
| -1 | 0 | +1 |
| +1 | +2 | +1 |
|----|----|----|
| 0  | 0  | 0  |
| -1 | -2 | -1 |
FIG. 5

METHOD AND APPARATUS FOR IMAGE CAPTURING TAMPERING DETECTION

CROSS-REFERENCE TO RELATED APPLICATIONS

This application claims benefit of U.S. provisional patent application Ser. No. 61/242,636, filed Sep. 15, 2009, which is herein incorporated by reference.

BACKGROUND OF THE INVENTION

1. Field of the Invention

Embodiments of the present invention generally relate to a method and apparatus for image capturing tamper detection.

2. Description of the Related Art

Tampering with an image capturing apparatus, such as a surveillance camera, may be considered to be changes in the appearance of the captured image that can compromise the integrity or usefulness of the capture image. Specifically, tampering can result from both deliberate and unintended physical handling of the device or from environmental conditions. For example, tampering may include scenarios where a fixed camera is moved or shaken, appearance of the video suddenly changes from lights being turned on or off, obstructions being placed in the camera view, or manipulation of the camera's lens, e.g. changes to aperture, focus, or zoom setting. In FIG. 1(a) shows an image pair illustrating camera movement before and after, FIG. 1(b) shows lights being turned from on to off, and FIG. 1(c) shows a camera view being obstructed by an object.

Thus, the ability of the apparatus to detect tampering without human supervision is of great utility with many applications in surveillance and business analytics. Automatic detection of changes which are true tamper events is challenging because the apparatus must be robust to benign events, such as objects in the scene that are large but do not completely obstruct the view as well as camera jitter caused by wind.

Therefore, there is a need for a method and/or an apparatus for an improved image capturing tampering detection.

SUMMARY OF THE INVENTION

Embodiments of the present invention relate to a method and apparatus for detecting tampering with an image capturing device. The method determines whether or not tamper has occurred based on a weighed assessment of several metrics, including the instantaneous change in image intensity, the pixel area of the foreground mask as a percentage of the total image area, and the percentage overlap between an edge image from the current frame and an edge image from the background. The method declares that tamper has occurred if the weighted score of said metrics exceeds a threshold.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is an embodiment depicting a benign event of a scene or background image, a current frame and a foreground mask;

FIG. 4 is an embodiment depicting a tamper event of a scene image and a current frame;

FIG. 5 is an embodiment depicting filters for an edge detector;

DETAILED DESCRIPTION

Figure 1:
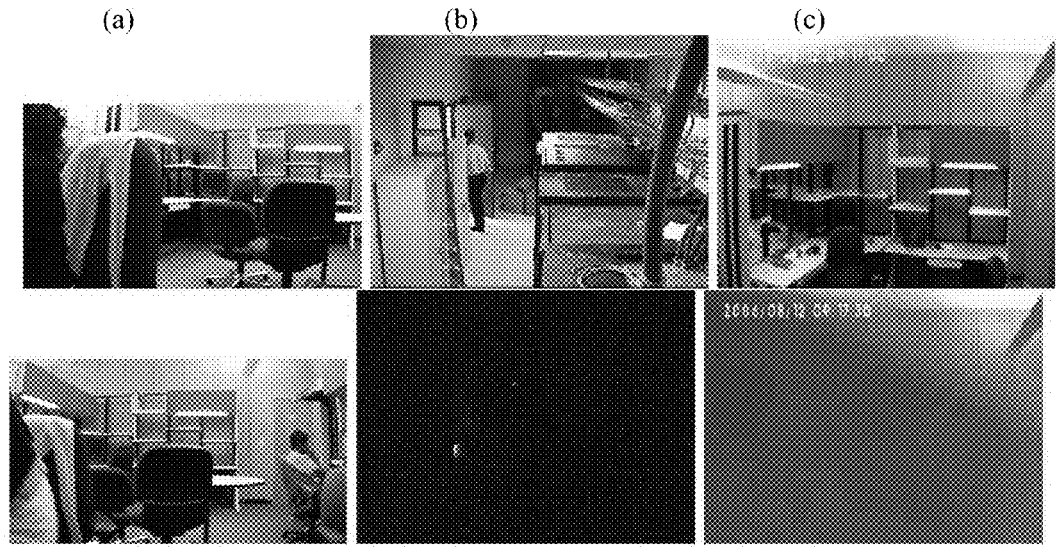
FIG. 1 is an embodiment depicting examples of tampering with an image capturing apparatus.
Figure 2:
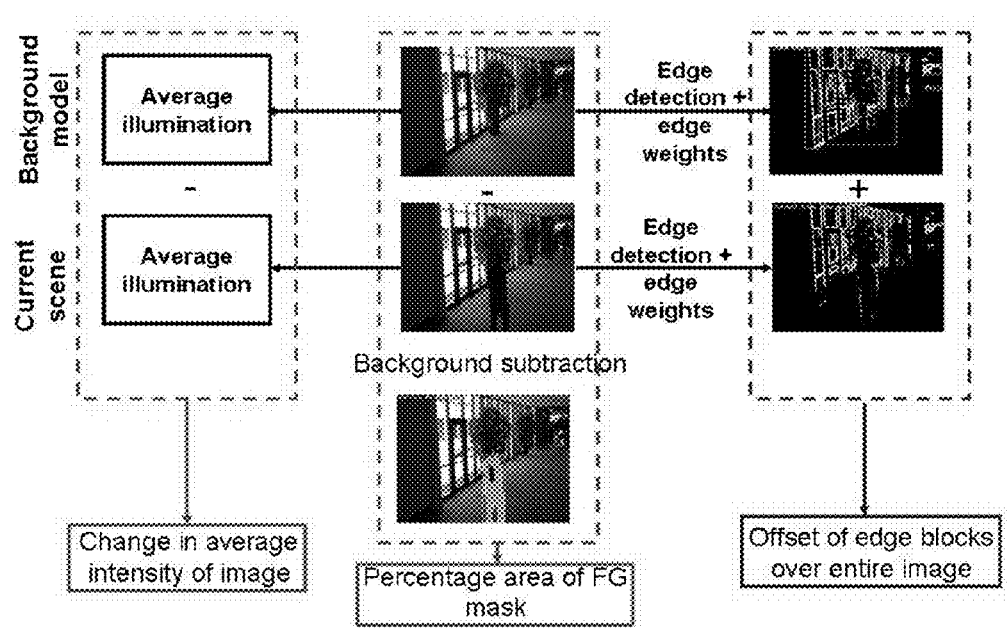
FIG. 2 is an embodiment depicting a method for detecting tampering with an image capturing apparatus.

FIG. 2 is an embodiment depicting a method for detecting tampering with an image capturing apparatus. Utilizing well understood methods, such as binary background subtraction, areas in the current image frame that appear different from an otherwise static background scene can be identified. Pixel locations where the measured difference is at or beyond a threshold are labeled foreground pixels, e.g. value at image location is binary ON or 1. Pixel locations where the measured difference is below this threshold are labeled background pixels, e.g. location value is binary OFF or 0. The binary image formed by this labeling creates a foreground mask. The corresponding foreground mask area can then be measured by simply adding all binary ON pixels in the mask. The area of the foreground mask as a percentage of the total image area may be used to determine if tamper has occurred. Next, using the edges of the scene, one may determine if there is a match between the current frame C and the background model S. Finally, using a measure of the illumination of the scene, one may determine whether there has been a drastic change in the scene illumination. Such metrics are described in further detail below.

In general, the foreground mask identifies areas of change measured by the image capturing device. It indicates those locations in image where pixel values change between some prior state, often represented by a background frame of the scene (S), and the current state, as represented by the current image frame (C). If the entire scene changes, the foreground mask may cover a majority of the scene. By using this knowledge, one may determine the likelihood that an image capturing apparatus moved.

Consider two images, the scene (S) and the current frame (C). When there is an object in the foreground of the image, it can be separated out from the background of the image using background subtraction. FIG. 3 is an embodiment depicting a benign event of a scene image, a current frame and a foreground mask.

In a situation where the camera has been moved or the lens has been covered, the corresponding pixels between the current frame and the scene image will no longer match up. Therefore, it will seem like there is a large object in the foreground that occupies almost 100% of the scene. By using the size of this object, one may determine whether or not tamper has occurred.

FIG. 4 is an embodiment depicting a tamper event of a scene image and a current frame. As shown in the third image of FIG. 4, the foreground object mask covers almost the entire image. So, a ratio of the size of that object (foreground mask)

to the size of the image is utilized as the measure of tamper. If F is the likelihood of tamper, f is the number of pixels in the foreground object and 'a' is the area of the entire image, then F is defined as:

$$E = \frac{100 \times f}{a} \quad (1)$$

While the size of foreground objects can be used to determine tamper, it may not always be reliable when there are large objects moving in the foreground. Thus, the edges in the scene are utilized to determine whether or not a tamper activity has occurred. From a representative scene image, the image capture device may detect the prominent edges in the scene by filtering the representative image with an edge detection kernel. Since edge information is more stable under varying illumination, evaluating whether the edges have moved between the scene and the current frame, is a robust means to determine whether the camera has moved or not.

An edge detection method, such as a Sobel Edge detector, can be utilized to find edges in the scene S and current frame C. The Sobel edge detector applies a 2D kernel to determine the image horizontal and vertical gradients at every pixel, then evaluates their magnitude to find edges in a gray-scale image. It convolves a 3×3 vertical and horizontal filter over the entire image and take the sum of the absolute values of these scores at every pixel to determine its gradient magnitude, which may be called the image gradient I. FIG. 5 depicts the two-dimensional filter coefficients used to obtain the image gradients.

Assume I(i) is the gradient magnitude at pixel location i. Similarly, C(i) is the pixel at position i in the current edge image. The edge threshold, T, is determined based on the average illumination of the scene. Then, C(i) is determined using Equation 2.

$$C(i) = \begin{cases} EDGE & I(i) > T \\ NONEDGE & \text{otherwise} \end{cases} \quad (2)$$

Figure 6:
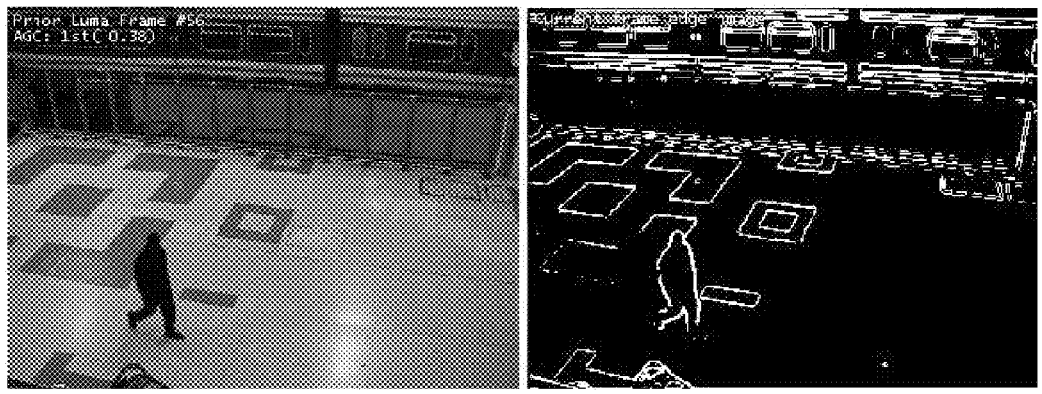
FIG. 6 is an embodiment depicting a frame and a corresponding edge image.

FIG. 6 is an embodiment depicting a gray-scale frame and a corresponding binary edge image, where EDGE=1 and NONEDGE=0. Thus, FIG. 6 shows an input image and the resulting edge image that picks locations with the most prominent edges, e.g. where edge gradient magnitudes exceed some threshold T.

Figure 7:
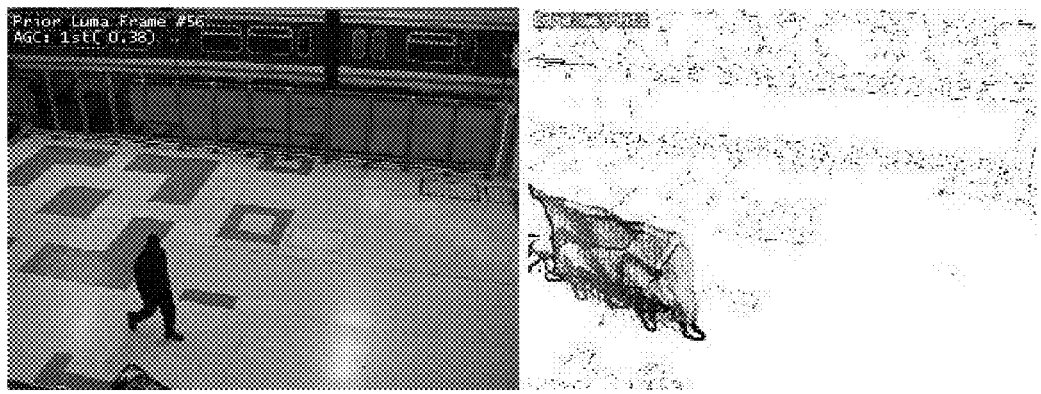
FIG. 7 is an embodiment depicting a frame and a weight image of a person walking through the scene.

FIG. 7 is an embodiment depicting a single frame from an image sequence depicting a person walking through the scene and the corresponding weight image that reflects edge consistency; Whiter areas in the weight image indicate areas where the edge magnitude in the current frame is similar to the edge magnitude in the background scene frame; darker area indicate dissimilar areas weighted over time.

FIG. 7 is an embodiment depicting a frame and a weight image of a person walking through the scene. The weight image is a two-dimensional map of the scene that assists in determining the consistency of edge information in an image. Edge information is regarded as the presence or absence of an edge. In regions of the image where objects move frequently, background edges can become occluded and foreground objects can introduce new edges; hence, these location offer low reliability scores, e.g. near zero; however, in highly stable regions with little or no object traffic or difference, edge information is likely very consistent resulting in high reliability. Such weight maybe utilized to determine which edges are used in our edge difference measure. The policy for weighing the edges is described in Equation 3. Here, C(i) is the pixel in location i of the edge image, B(i) is the $i^{th}$ pixel of the edge image of the background model, W(i) is the weight of pixel i.

$$W(i) = \begin{cases} W(i) + 1 & C(i) = B(i) \\ 0 & \text{otherwise} \end{cases} \quad (3)$$

This image gets updated with every frame. Such information maybe utilized when generating the edge image as well. So Equation 2 is modified slightly to account for the reliability of each pixel, as shown in Equation 4.

$$C(i) = \begin{cases} EDGE & I(i) > T \\ NONEDGE & \text{otherwise} \end{cases} \quad (4)$$

As an object moves through a scene, the values in the region of the object get set to zero and then start incrementing as they stabilize. When they reach a predetermined threshold, they can become edges if they are in an edge rich region. In FIG. 7 shows the weight image as a subject enters the scene on the left headed towards the right. We notice that there are isolated regions of unstable pixels; however, those correspond to the boundaries between edges and smooth regions. Those pixels are less reliable so they are consistently given a weight of 0.

We devised a block matching approach to determine the change of position in edge-rich areas of the image. By using a weighted score of the tamper evidence from each block, one can evaluate the likelihood that tamper has occurred. The inputs for this algorithm are the edge images of the background model B and the current frame C. Once we have the edge images, connected components in the scene image are found, which is a bounding box of each edge region. Thus, the locations of the edge-rich areas in the image are determined. We refer to each connected component as a block.

Figure 8:
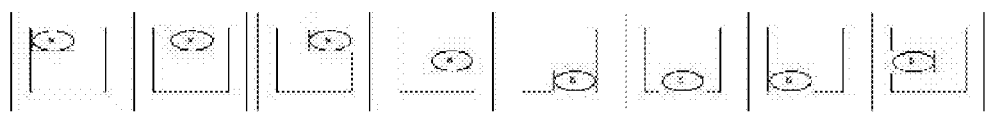
FIG. 8 is an embodiment depicting a search position for a radius=1.

For each block includes the following information:
1. X-coordinate of the top left corner
2. Y-coordinate of the top left corner
3. The height of the block
4. The width of the block In one embodiment, the goal with the blocks is to determine its closest match in the current frame. For a block j in the set of all blocks J, one may start with a radius of 0 and search for that block in the current frame, as shown in FIG. 8. This process continues until the entire region within a predetermined radius is searched.

We then use the best possible position and its two-dimensional offset to determine whether the image has moved or not. At the end of the search, we know the best possible match we can obtain to the current block. We call this block j. We then store the offset of region j in the current frame from the corresponding position of the block in the scene image. We also store information about the actual reliability of the match between j and j and the value of j which is based on the edge richness of that block. The information stored is detailed below:

1. Value V: Measure of how edge-rich the block is with respect to the other blocks. It is calculated as a ratio of edge pixels in block to maximum edge pixels of all blocks. If n(j) is the number of edge pixels in a block, then the value of block j, called V(j) is calculated as in Equation 5.

$$V(j) = \frac{n}{\max n(j)}, \forall j \in J \quad (5)$$

2. Offset O: Difference between position of closest match to corresponding position in scene image. If there is a shift of x pixels in the horizontal direction and y pixels in the vertical direction, then O(j) is defined as in Equation 6

$$O(j) = \max\left\{\max\{|x|, |y|\}, \frac{3 \times (|x| + |y|)}{4}\right\} \quad (6)$$

3. Reliability R: Percentage similarity between closest match and current block. We square the score so as to give higher preference for blocks that are more similar, instead of using a linear relationship. If m(j) is the number of matching pixels and n(j) is the number of edge pixels in j, then the reliability R(j) is defined in Equation 7.

$$R(j) = \frac{100 \times m(j)^2}{n(j)^2} \quad (7)$$

Once we have generated this information for all blocks in J, we determine an evidence score of likelihood that the camera is stationary versus the likelihood that the camera has moved. We create two subsets N and T. If the offset for a block is 0, that block is added to set N, otherwise it is added to set T. We then calculate evidence scores of tamper S(T) and no tamper S(N) as shown in Equation 8. They are combined to give us E, the evidence that tamper has occurred based on the edges in the scene. The greater the score, the more likely the camera has been tampered with.

$$E = \frac{100 \times S(T)}{S(T) + S(N)}, \text{ where} \quad (8)$$
$$S(T) = \sum_{j \in T} V(j) \times R(j) \text{ and } S(N) = \sum_{j \in N} V(j) \times R(j)$$

Figure 9:
FIG. 9 is an embodiment depicting images with illuminations of 10%, 90% and 50%, respectively.

When the lights are turned on or off in a scene, the intensity of the pixels changes drastically. Thus by capturing an average illumination of the current frame and comparing it to that of the scene, we can determine if the lighting has changed. A negative difference implies that the lights have been turned off and a positive difference implies that the lights have been turned back on. In FIG. 9, we show three example images and their approximate illumination score.

We now have three measures, each with a score between the range of 0 and 100, which tells us whether or not tamper has occurred:
1. Foreground object size (F): Size of objects in the foreground of the scene
2. Edge difference (E): Evidence of edges moving in the scene 7
3. Average illumination (I): Change in average illumination of the scene We first combine the edge difference score, E and foreground object size, F, to determine if camera movement has occurred. The ratio of the two variables is based on the presence of edges. We define a variable, α, which is proportional to the ratio of the longest edge in the scene, L, to the total height of the scene, H. The higher this value, the more weight we assign to E in the tamper detection score, T. In scenes that are edge-rich, this score is high and we depend more on edges than on the size of foreground objects. In scenarios, where the number of edges is few or where the scene is blurry, we rely more on the foreground object size. In Equation 9, we show how the tamper score is calculated once α is determined.

$$T = \alpha \times E + (100 - \alpha) \times F \quad (9)$$

The algorithm was implemented into the DMVA1 software, which includes other capabilities such as motion detection and trip zone. The input required by the user is a sensitivity measure, which determines how sensitive the system is to change in the scene. The user also inputs a number of frames during which other functions are switched off, if the camera is tampered with. For example, if the number of frames is set to 50, once a tamper event has occurred, any other functionality that is running is switched off for 50 frames. However, during this time, tamper detection is still running and will get triggered again if there is any other tamper activity. As output, there are two tamper modes:
    1. DMVAL DETECTOR TAMPER
    2. DMVAL DETECTOR NONE
    We also report a type of tamper activity and the types are:
1. DMVAL TAMPER LIGHTS ON
2. DMVAL TAMPER LIGHTS OFF
3. DMVAL TAMPER MOVEMENT For our evaluation, we used a set of real-world sequences acquired from a range of scenarios. We divided the sequences into two subsets: (1) sequences with camera movement and (2) sequences with lights on/off events. In this section, we list the details of the testing sequences, the evaluation approach and our results.

There were 16 sequences with camera movement and 9 sequences with lights on/off events, acquired from real-world settings. There were indoor and outdoor environments, resulting in a range of edge-richness scenes and activities.

Since it is a difficult task to exactly label at which frame a particular event may be triggered, we evaluated our technique at the level of a second. If the event was caught within a second of the ground truth data, we labeled that event as a true positive. However, if the event was either caught outside that window or a benign event was triggered as a tamper event, it was labeled a false positive.

In some cases, if the tamper event is caught within a few second of the actual event, it may be sufficiently accurate for the system. So we evaluate our system when we give it a 1-second, 2-second and 3-second window within which to trigger the event.

While the foregoing is directed to embodiments of the present invention, other and further embodiments of the invention may be devised without departing from the basic scope thereof, and the scope thereof is determined by the claims that follow.

What is claimed is:
1. A method for detecting tampering with an image capturing device, comprising:
    determining a change has occurred in an intensity of an image;
    determining a pixel area of a foreground mask as a percentage of a total image area;

detecting the percentage overlap between an edge image from a current frame and an edge image from a background;

utilizing the intensity, the pixel area of the foreground mask, and the percentage overlap to determine a weighted score; and comparing the weighted score to a threshold and detecting tampering with an image capturing device when the weighted score is greater than a threshold.

2. The method of claim 1 wherein the step of determining a change has occurred in the intensity if an image utilizes average illumination of background model and a current scene.

3. The method of claim 1 further comprising determining the reliability of edge information for each pixel location in the scene.

4. An apparatus for detecting tampering with an image capturing device, comprising:

means for determining a change has occurred in an intensity of an image;

means for determining a pixel area of a foreground mask as a percentage of a total image area;

means for detecting the percentage overlap between an edge image from a current frame and an edge image from a background;

means for determining utilizing the intensity, the pixel area of the foreground mask, and the percentage overlap to determine a weighted score; and means for comparing the weighted score to a threshold and detecting tampering with an image capturing device when the weighted score is greater than a threshold.

5. A non-transitory computer readable medium comprising software that, when executed by a processor, causes the processor to perform a method comprising:

determining a change has occurred in an intensity of an image;

determining a pixel area of a foreground mask as a percentage of a total image area;

detecting the percentage overlap between an edge image from a current frame and an edge image from a background;

utilizing the intensity, the pixel area of the foreground mask, and the percentage overlap to determine a weighted score; and comparing the weighted score to a threshold and detecting tampering with an image capturing device when the weighted score is greater than a threshold.

6. The computer readable medium of claim 5, wherein the step of determining a change has occurred in intensity if an image utilizes illumination of background model and a current scene.

* * * * *